3,109,223
PROCESS FOR MANUFACTURING
ANTIFRICTION BEARINGS
Albert Richard McCloskey, Fairfield, Conn., assignor, by mesne assignments, to SKF Industries, Inc., Philadelphia, Pa., a corporation of Delaware
Filed Jan. 26, 1960, Ser. No. 4,683
2 Claims. (Cl. 29—148.4)

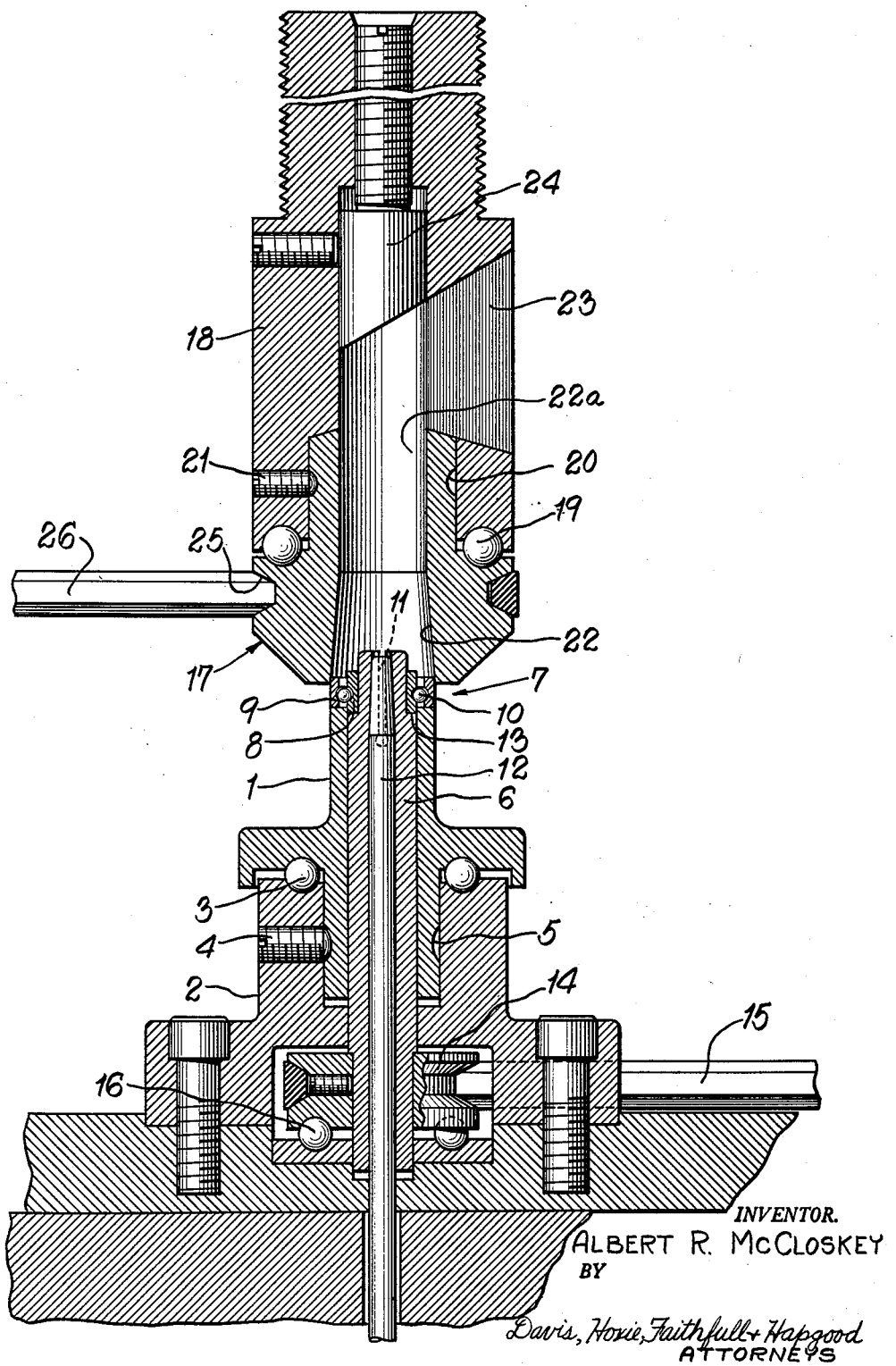

My invention relates to antifriction bearings, and more particularly to bearings having two ring-like members in telescoped relation with a full complement of rolling elements between them having solid, unbroken machined outer and inner raceways and deep, burnished grooves. In bearings of this type, where it is essential to maintain close running tolerances between the parts, a burnishing operation is required to remove any irregularities or pits in the raceways introduced during fabrication or resulting from imperfections in the raw material.

In my United States patent application serial No. 612,679, filed September 28, 1956, now Patent No. 2,929,131, granted March 22, 1960, of which the present application is a continuation-in-part, I have shown that such bearings can be made by (1) diminishing the space between the members by plastically deforming one of them and (2) burnishing the raceways of the members by rotating one of the members with respect to the other member during at least a part of the step of diminishing the space between them; and in that application I have described in detail a preferred embodiment of apparatus and a process for performing that operation. The method of diminishing the space between the members disclosed in my previous application was by increasing the size of an undersized inner member by passing a tapered punch through it. I now describe below a preferred embodiment of an additional method for performing the operation which is preferable to those described in the earlier application in certain circumstances.

The single drawing shows a sectional view of the apparatus. It includes a hollow mount pin 1 rotatably disposed on a thrust bearing 3 within a die shoe 2. Vertical movement of the mount pin 1 is prevented by a set screw 4 which rides in a groove 5 in the lower portion of the mount pin. The hollow mount pin 1 has a central expansible member 6. The apparatus described thus far is designed to support the parts of an unfinished bearing 7, with an inner member 8 being supported on the member 6 and an oversized outer member 9 being supported on the pin 1. Both members 8 and 9 have raceways in their adjoining walls and a full complement of rolling elements between them. The upper end of the member 6 is split as at 11, to permit expansion. This expansion, the purpose of which is to hold tightly the inner member 8, is accomplished by the action of a central taper pin 12 whose vertical movement may be controlled in any desired manner (not shown). The central member 6 is stepped at 13 to seat the inner member 8 of the bearing and maintain it in the proper spaced relationship with respect to the other bearing components during the contracting operation. The central member 6 is adapted for independent rotation within the mount pin 1. The lower end of the member 6 is fitted with a V belt pulley 14 driven by a belt 15. The pulley is equipped with a thrust bearing 16. The upper end of the mount pin 1 is so designed that it supports only the outer member 9 of the bearing.

Above the part of the apparatus already described a swaging die 17 is rotatably mounted within a chuck member 18. The chuck member 18 is adapted to be seated in a hydraulic press not illustrated. Between the die 17 and the chuck 18 is a vertical thrust bearing 19. Groove 20 in the shank of the die 17 is adapted to receive the rounded end of a set screw 21 mounted in the body of the chuck member 18. The die 17 has a circumferential groove 25 to receive V belt 26 by which rotational energy from a source, not shown, is imparted to the die 17. The die 17 has a central tapered cavity 22 which converges inwardly into a cylindrical axial cavity 22a. The cavity 22a extends beyond the die member into the chuck member 18. The chuck member 18 has a tapered opening 23 in one side, communicating with internal cavity 22a, and a tapered cylindrical plunger 24 which is axially adjustable within the upper portion of the internal cavity 22a.

The operation of the above described bearing fabrication device is as follows:

The unfinished pre-assembled bearing assembly 7, the outer member of which is of ductile metal, is placed on the central expansible member 6 and mount pin 1 when the die 17 is in the raised position. The taper pin is then elevated either automatically or manually by a mechanism not illustrated, to expand the upper end of the member 6 and lock the inner member 8 to the member 6. Rotational energy is then imparted to the belts 15 and 26 in such a direction that the rotating members are driven in opposite directions.

The downward thrust of the hydraulic press is then initiated. As the die member 17 descends, the upper edge of the oversized outer member 9 enters the cavity 22. Application of hydraulic pressure to the die 17 forces the deformable member 9 into the cavity 22 where the member 9 is gradually reduced in diameter to a final predetermined size, dictated by the dimension of the cylindrical portion of the die 22a. Fabrication of the first bearing is complete as it is forced into the cylindrical cavity 22a. The succeeding bearing to be fabricated pushes the first bearing further up into cavity 22a. As this action is repeated, completed bearings, stacked in cavity 22a, move axially towards the opening 23 in the side of the chuck member 18, from which they are discharged. The vertically adjustable tapered member 24 ejects any completed bearings having a tendency to stick in the cavity 22a.

As the outer member 9 of the bearing is gradually diminished in size by the action of the die 17, the die transmits radial force to the outer member and through it and the rolling elements 10 to the race portion of the inner member 8. The combined action of the counter rotation of the inner and outer members and the radial force imparted by the die through the rolling elements 10 burnishes the respective grooves and removes any surface irregularities in the races, and provides the proper running tolerances in the final bearing.

I have found that suitable bearings result if only one of the bearing members is rotated while the other is held stationary during the swaging step. However, I find that the assembly and burnishing time may be minimized when the bearing members are both rotated in opposite directions and this is the preferred embodiment of my invention.

I claim:

1. A method of making antifriction bearings of the type having an outer member of ductile material with a circular opening through it and a machined raceway in the wall of the opening, an inner member with a circular outer wall and a second raceway in its outer wall, and a full complement of rolling elements between the members, comprising grooving the raceway in the inner member and grooving the raceway in the outer member by machining, assembling the inner member in the opening of an oversized outer member with the raceways aligned and with a full complement of rolling elements inserted between the preformed raceways, diminishing the space between the members by radially contracting the outer member plastically to interlock the inner and outer members through the rolling elements and force the outer member in a radial direction against the rolling elements and the rolling elements against the inner member, and rotating one member with respect to the other during at least part of the contraction step to remove surface irregularities in the preformed raceways and provide proper bearing tolerances.

2. A method of making antifriction bearings of the type having an outer member of ductile material with a circular opening through it and a raceway in the wall of the opening, an inner member with a circular outer wall and a second raceway in its outer wall, and a full complement of rolling elements between the members, comprising grooving the raceway in the outer member by machining, assembling the inner member in the opening of an oversized outer member with the raceways aligned and with a full complement of rolling elements inserted between the preformed raceways, diminishing the space between the members by radially contracting the outer member plastically to interlock the inner and outer members through the rolling elements and to force the members in a radial direction against the rolling elements, and rotating the inner and outer members in opposite directions during at least part of the contraction step to remove surface irregularities in the preformed raceways and provide proper bearing tolerances.

References Cited in the file of this patent

UNITED STATES PATENTS

| | | |
|---|---|---|
| 881,471 | Hoffman | Mar. 10, 1908 |
| 941,632 | Geschke | Nov. 30, 1909 |
| 1,074,228 | Whitney | Sept. 30, 1913 |
| 1,080,169 | Reed | Dec. 2, 1913 |
| 2,629,165 | Stillwagon | Feb. 24, 1953 |
| 2,719,765 | Menne | Oct. 4, 1955 |
| 2,783,528 | Menne | Mar. 5, 1957 |
| 2,910,765 | Heim | Nov. 3, 1959 |
| 2,913,810 | Heim | Nov. 24, 1959 |
| 2,929,131 | McCloskey | Mar. 22, 1960 |